(12) United States Patent
Marois (10) Patent No.: US 8,875,778 B2
(45) Date of Patent: Nov. 4, 2014

(54) GEOTHERMAL ADIABATIC-ISOTHERMAL HEAT SINK EXCHANGE SYSTEM

(75) Inventor: Patrick Marois, Lac-Beauport (CA)

(73) Assignee: Thermodynamique Solutions Inc., Lac-Beauport (CA)

( * ) Notice: Subject to any disclaimer, the term of this patent is extended or adjusted under 35 U.S.C. 154(b) by 464 days.

(21) Appl. No.: 13/373,404

(22) Filed: Nov. 14, 2011

(65) Prior Publication Data

US 2012/0118529 A1 May 17, 2012

Related U.S. Application Data

(60) Provisional application No. 61/456,886, filed on Nov. 15, 2010, provisional application No. 61/454,895, filed on Mar. 21, 2011.

(51) Int. Cl.
*F24J 3/08* (2006.01)

(52) U.S. Cl.
CPC ................................ *F24J 3/083* (2013.01); *Y02E 10/125* (2013.01)
USPC ............................................ 165/45; 165/136

(58) Field of Classification Search
CPC ............ F24J 3/08; F24J 3/082; Y02E 10/125; F28F 19/02; F28F 19/04; F28F 19/06
USPC ........................................ 165/45, 133, 134.1
See application file for complete search history.

(56) References Cited

U.S. PATENT DOCUMENTS

| 4,286,651 | A | * | 9/1981 | Steiger et al. ..................... 165/45 |
| 4,452,303 | A | * | 6/1984 | Bontje et al. .................. 165/142 |
| 4,993,483 | A | | 2/1991 | Harris |
| 5,561,985 | A | * | 10/1996 | Cochran ......................... 62/260 |
| 5,671,608 | A | | 9/1997 | Wiggs et al. |
| 5,816,314 | A | * | 10/1998 | Wiggs et al. ..................... 165/45 |
| 5,862,866 | A | * | 1/1999 | Springer ........................ 166/380 |
| 6,604,572 | B2 | * | 8/2003 | Kawamoto ..................... 165/133 |
| 6,626,579 | B1 | * | 9/2003 | Silvasi .......................... 384/476 |
| 2009/0107650 | A1 | * | 4/2009 | Feldmann ....................... 165/45 |
| 2010/0200192 | A1 | | 8/2010 | Consigny |
| 2010/0236749 | A1 | * | 9/2010 | Stojanowski ................... 165/45 |
| 2011/0036112 | A1 | * | 2/2011 | Livingston et al. ............. 62/260 |
| 2011/0091288 | A1 | * | 4/2011 | Desmeules .................... 405/232 |

FOREIGN PATENT DOCUMENTS

| CA | 2637510 | | 4/2009 | |
| DE | 102007024656 | A1 * | 11/2008 | ................. F24J 3/08 |
| DE | 102008004988 | A1 * | 7/2009 | ............. B65D 88/72 |

(Continued)

*Primary Examiner* — Allen Flanigan
(74) *Attorney, Agent, or Firm* — Mila Shvartsman (57) ABSTRACT

The present invention is a geothermal heat exchanger with a first exchanger, being a return loop inside a geothermal well. The first exchanger is provided for circulating a refrigerant for harvesting heat from the ground surrounding the geothermal well by conduction and convection. A second exchanger, also placed within the geothermal well, is formed from material with high heat transfer coefficient, and also adapted to harvest heat from the ground surrounding the geothermal well by conduction and convection. The first exchanger is completely encased within the second exchanger, and the second exchanger is placed in direct contact with ground surrounding the geothermal well. The outer walls of the first exchanger abut inner walls of the second exchanger along an entire length of the second exchanger. The first exchanger is a copper pipe, and the second exchanger is a housing made of non-ferrous metal with a high thermal diffusivity.

16 Claims, 11 Drawing Sheets

(56) References Cited

FOREIGN PATENT DOCUMENTS

| | | | | |
|---|---|---|---|---|
| EP | 2505937 A2 | * | 10/2012 | |
| JP | 2003206528 A | * | 7/2003 | ............ E02D 5/30 |
| JP | 2006052588 A | * | 2/2006 | |
| WO | WO 2010/122394 | | 10/2010 | |

* cited by examiner

DETAIL VIEW D

Figure 7

DETAIL VIEW C

DETAIL VIEW N

DETAIL VIEW G

GEOTHERMAL ADIABATIC-ISOTHERMAL HEAT SINK EXCHANGE SYSTEM

The present application is based on U.S. provisional patent applications No. 61/456,886 filed on Nov. 15, 2010 and No. 61/454,895 filed on Mar. 21, 2011.

The present invention is a combination of three methods of exchanging energy, in the form of heat, with the ground. The advantages of this invention over the prior art are numerous: the invention comprises a highly conductive exchanger housing that can be cheaply made from aluminum extrusions. The construction of the exchanger housing includes adiabatic insulation between its two channels, which results in preventing any undesirable heat transfer between the two halves of the exchanger due to the fact that one half of the exchanger is insulated from the other.

Another benefit of the present invention is its interior geometry, comprising a lattice of shortcuts for optimal heat propagation thus improving the isothermal exchange. The aluminum sink of the present invention carries energy from its pipe network to the geothermal well around the sink's circumference in the most uniform way. In this manner, it is possible to increase the capacity of the exchanger without losing efficiency, which is directly proportional to the temperature distribution all around the well.

Installation can be performed with commonly-found drilling apparatus, and longevity is assured by using coatings to arrest dilapidation of the system. This invention can be installed even by a sophisticated 'do-it-yourself' person.

BACKGROUND

There is known GEOTHERMAL HEAT TRANSFER SYSTEM U.S. Pat. No. 4,993,483 to Harris for a geothermal system that uses a cylindrical tube filled with sand or concrete to encase a return loop for exchanging heat with the earth.

There is also known A GEOTHERMAL DIRECT EXPANSION HEAT PUMP SYSTEM U.S. Pat. No. 5,671,608. The invention is a copper ground loop piping that is used as a ground exchanger, with refrigerant released at low pressure. Rather than use water or a glycol mix, as in the traditional geothermal heat exchange systems, this invention uses a refrigerant to exchange heat with the ground.

There is also known A BURIED VERTICAL SCREW-SUNK HEAT EXCHANGER FOR A HEATING OR COOLING INSTALLATION PCT/FR2008/051168. The invention is a steel pipe filled with water/glycol mix and re-circulated by a pump to exchange with ground energy and bring heat up from the ground.

The present invention relates to an optimization of traditional geothermal systems, direct expansion system and the screw-sunk heat system. The results of using the present invention are increased efficiency in extracting latent heat from the ground. This increase is partially as a result of the combination of the present invention's large dissipation capacity with low temperature variance distribution. The heat exchanger of the present invention incorporates two channels for exchange fluid, one channel for going up, and one channel for going down. The present exchanger housing is made of aluminum, and could be made in different diameters to optimize contact with the geothermal well in the ground.

Aluminum has a heat transfer coefficient of about 200 W/m·K, and is more efficient to carry the potential energy from the ground than concrete, whose heat transfer coefficient is about 2 W/m·K. The adiabatic-isothermal. heat sink exchanger is superior to present art due to the fact that it is more beneficial to exchange heat using an exchanger with a large circumference instead of two smaller circumferences.

However, the present invention is not restricted to aluminum only, and any other similar materials, such as magnesium or other known substances having high heat transfer could also be used. The resulting effect is that this exchanger's loop can bring up more heat out of the ground thanks to its surface area that is in contact with the ground inside the well.

The advantages of the present invention are numerous: material costs are brought down to a minimum. The exchanger is extruded from aluminum in pre-determined lengths. The preferred embodiment comprises 20-foot lengths, allowing to make 40-foot, 60-foot, or any multiple of 20-foot exchangers desired. Installation is simplified by the fact that the exchanger is delivered in 20-foot sections that are joined at the installation site. Continuity of fluid flow between sections is assured by the present embodiment's pipe joint fittings; joints can be sealed immediately prior to installation of the exchanger into the ground.

DETAILED DESCRIPTION OF THE PREFERRED EMBODIMENT

The present invention relates to a geothermal heat exchanger that can use various kinds of exchange fluids such as ionized water, water/glycol or any other refrigerants. The first embodiment of the present invention is shown on FIGS. 1-23, being an adiabatic-isothermal heat sink exchanger utilising an exchange fluid circulating inside a closed copper loop. The copper loop is trapped inside two identical halves made of extruded aluminum, the entire system forming a cylindrical aluminum exchanger. This system is able to withstand pressures up to 1,000 PSI. The second embodiment of the present invention, shown on FIGS. 24-33, is an adiabatic-isothermal heat sink exchanger utilising exchange fluids inside an aluminum cylindrical profile. It has two aluminum piping systems integrated into the extrusion itself. This system is limited to withstand pressures rated up to 250 PSI.

Both systems perform similar work, except in the second embodiment, when using refrigerants with a discharge pressure rate higher than the tolerated pressure rate of the adiabatic sink exchanger, such refrigerants should be used on suction side only, not on the discharge side.

In the geothermal exchange, two things are important to understand: the capacity, and the temperature distribution of the geothermal exchanger. The best way to measure the exchanger capacity it is to exchange heat with water in a closed recirculation system. The high thermal capacity of water will be not affected by the thermal temperature distribution on the exchanger, and water will be ideal to optimize the saturated sections of the outer exchanger's surface.

The capacity is a function of the thermal heat path, which is in accordance with accepted heat conduction equations. The heat transfer is directly proportional to thermal conductivity, thermal diffusivity and cross-section area. The sum of resistive paths, just like electricity, determine the capacity of a heat exchanger. This means that an exchanger made of highly thermal conductive material with a large circumference will perform at a larger capacity than two exchangers made of low thermal conductive material with smaller, yet equivalent circumferences. The adiabatic heat sink exchanger benefits from a large circumference.

The thermal temperature distribution is in accordance with heat conduction equation for the cylindrical case and two-dimensional heat conduction equation. The ideal exchanger is isothermal, with no temperature variance between all points on the outer exchanger surface in function of time. The sum of the temperature variances will give the saturated temperature distribution. These variances are considered as inefficiency if compared to the ideal exchanger; there is a way to compare shape factor that is used in two-dimensional heat conduction equation to determine the heat flux, but this equation is suitable only with uniform distribution. The exchanger capacity will be affected by the temperature distribution and saturated factor will correct the capacity in function of thermal conductivity of ground. The saturated factor acts as the shape factor used in two-dimensional heat conduction equations with uniform distribution. The adiabatic-isothermal heat sink exchanger has a very low temperature variance because the lattices of shortcuts optimize the heat propagation uniformly around the aluminum circumference that is in contact with geothermal filling (grout) and the well's ground. The adiabatic effect avoids the heat transfer between the two channels of the exchanger. The insulation components are urethane foam and air. The heat propagation in aluminum is one hundred times higher than in concrete, which is a substantial advantage over prior art. The heat has no path restrictions, and it comes as an isothermal exchanger.

Another advantage of using a highly conductive metal occurs during exchange with ground in the winter. The soil has a percentage of moisture, and this moisture assists the exchange between the ground and the adiabatic-isothermal heat sink exchanger. This heat convection by the phase-changing of water will transform it into ice. After some hours of work, ice will form around the well. This ice has a similar thermal conductivity to the ground. When the system shuts off, the action of ice surrounding the top surface will create a natural heat convection flux to melt the ice around the well. The rate of this heat convection is two times higher than the heat conduction rate. Ice melting capacity is the isothermal capacity boost heat flux, resulting in the ice melting very quickly. The well is auto-regenerating, meaning that a thermal shift from very low temperature to heating mode can be accomplished in only a couple hours. If a traditional (concrete or sand) geothermal well is frozen, it could take one day, and up to a week to unfreeze, because the concrete is unable to transfer heat from the bottom to the top very quickly, unlike aluminum. We could say that the adiabatic-isothermal heat sink exchanger is auto-regenerating in the ground cooling condition. In the ground heating condition, this is not true, because the exchanger is unable to produce heat convection by phase-changing with water, and the boiling point is too far for temperature heat exchange.

Referring now to drawings, FIGS. 1-23 show the preferred embodiment of the first model of the present invention, wherein a hollow aluminum extrusion 1 is in the shape of a 4" wide and 20-foot long pipe. On the perspective view, the hollow aluminum extrusion 1 is in the shape of a 4", 6" and 8" wide and up to 20-foot long pipe. Powder paint 25 is applied on the outside surface of housing 1 to give optimal protection against galvanic effect from the surrounding ground. Electrical oxidation inhibition compound 3 is also applied on copper pipe surface 2 to give optimal protection against galvanic reaction between aluminum and copper.

First exchanger element or housing 1 of the first embodiment comprises an assembly of two symmetrical extrusions or housings 1 formed from a non-ferrous material having thermal conductivity up to 150 w/m*k and thermal diffusivity up to 80 mm$^2$/s, such as aluminum and having a preferable length of 20 feet. A second exchanger element comprising a copper pipe 2 is sandwiched between said extrusions 1 in channels 24 formed in housing 1 and is provided for circulation of a refrigerant. Width of said channel 24 (see FIG. 18) has at least 80% press fit contact with the copper pipe 2. Foam insulation 23, sandwiched between said extrusions 1, fills some available space inside sandwiched housings 1 applied at junction. Housing or extrusions 1 are held together by aluminum welding tacks 20, which are half-inch long, welds being made on the welding edges 11 at each foot on both seams of assembly where copper pipes 2 are immobilized. Welds are made on welding edges 11 to prevent galvanic spots that can permit rust to attack the exchanger and its components after exposure to the elements during its lifetime.

Electrical oxidation inhibition compound 3 is also applied on copper pipe surface 2 to give optimal protection against galvanic reaction between aluminum and copper. Electrical oxidation compound 3 fills the 20% tolerance gap between outer wall of copper pipe 2 and inner channel 24 of housing 1 allowing maximum transfer of heat from the inner channel 24 of housing 1 and outer wall of copper pipe 2.

The copper pipes 2, sealed with the electrical oxidation inhibition compound 3, are tightly fitted against the channels 24 of extrusions 1 to provide a watertight arrangement, acting as an O-ring system. The copper pipes 2 are swedged at one end to make a welding union connection 12 (see FIG. 17). The immobilization can be accomplished through other ways, such as by strapping or by bolting. The strapping could be made with nylon or stainless steel straps tightened around the extrusions 1 assembly. The bolting arrangements are made from aluminum treaded rods and aluminum nuts to tighten, which pass through the extrusions 1 assembly.

Multiple extrusions 1 can be linked together to form a longer heat exchanger. In reference to the cross-sectional view of assembly, we see aluminum shear joint tube 4 held in place by rivets 13, and end extrusion 6 embodying u-bend tube 5 with the end cap 7. Aluminum shear joint tube 4 that spans two extrusions 1 is held in place with rivets 13. Multiple extrusions 1 can be linked together to form a longer heat exchanger.

Figure 1:
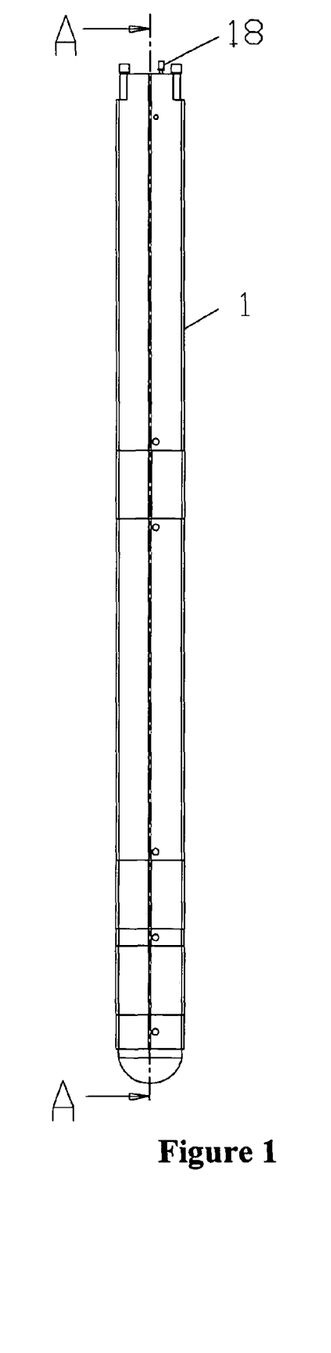
FIG. 1 shows a front view of the exchanger according to the first embodiment of the present invention.
Figure 2:
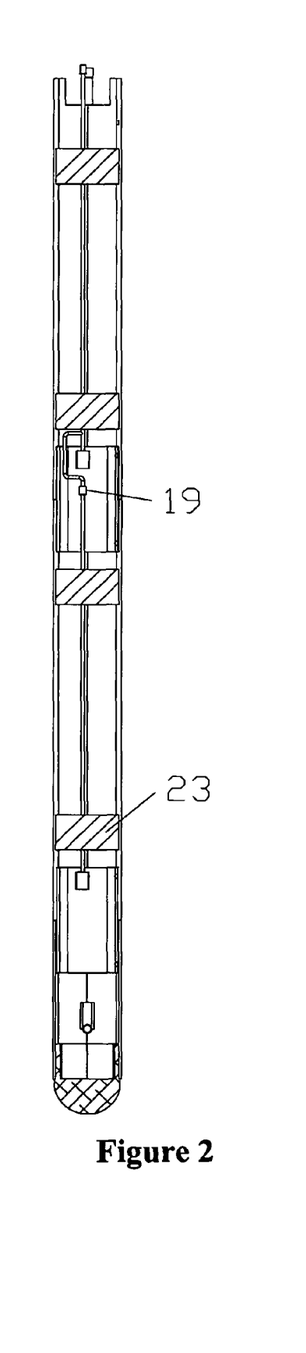
FIG. 2 shows a cross-sectional view of FIG. 1 along lines A-A.
Figure 3:
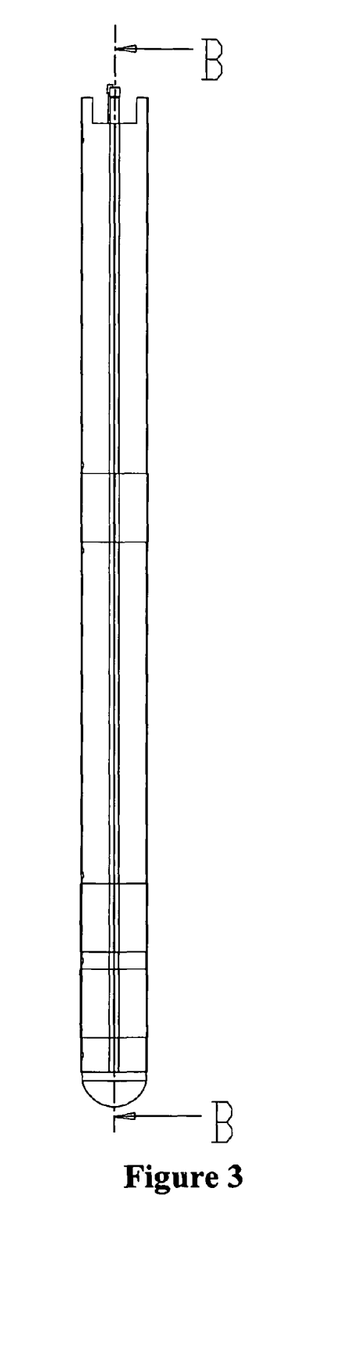
FIG. 3 shows a side view of FIG. 1.
Figure 4:
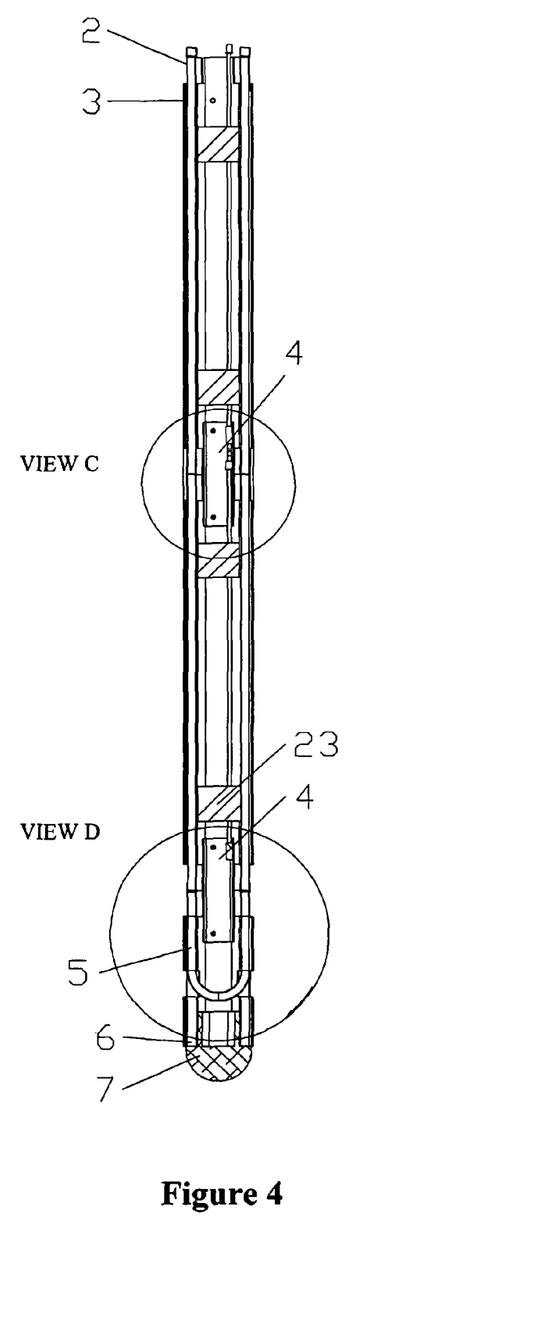
FIG. 4 is cross-sectional view of FIG. 3 along lines B-B.
Figure 5:
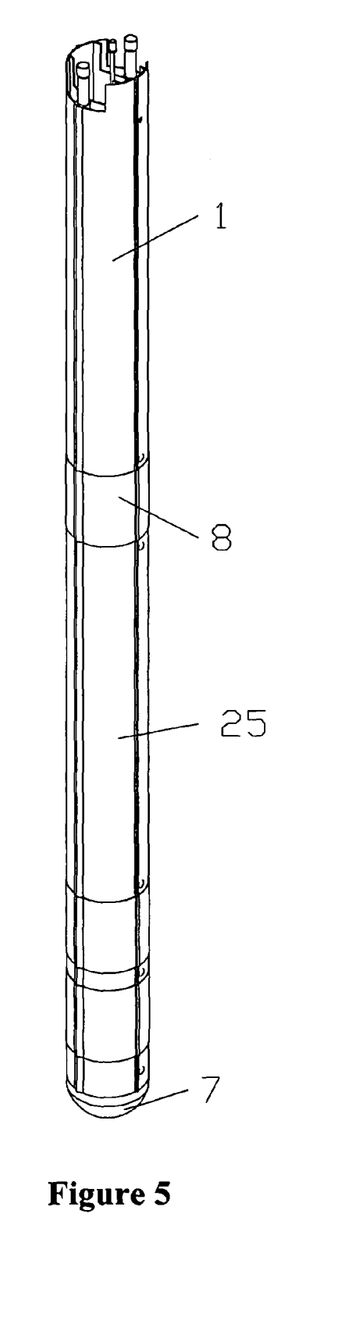
FIG. 5 is a perspective view of FIG. 1.
Figure 6:
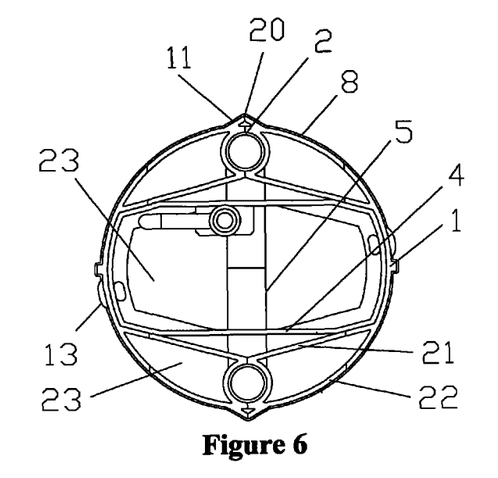
FIG. 6 is a top view of FIG. 1.
Figure 7:
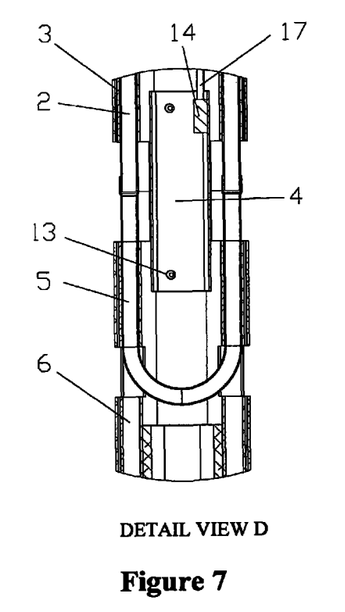
FIG. 7 is a fragmental view D of FIG. 4.
Figure 8:
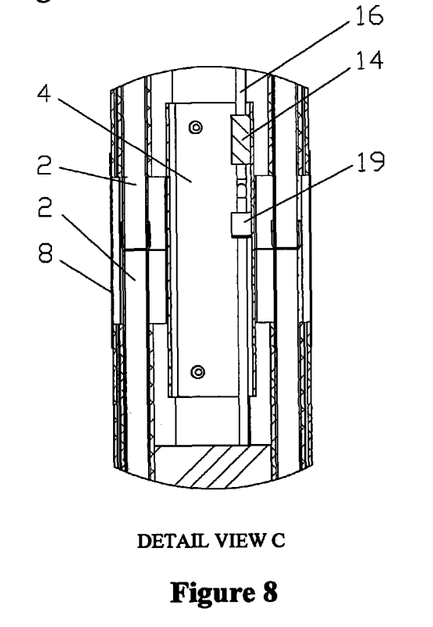
FIG. 8 is a fragmental view C of FIG. 4.
Figure 9:
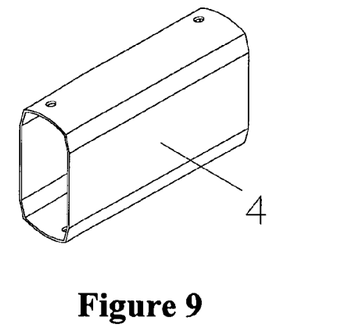
FIG. 9 is a perspective view of welding joint shown on FIG. 6.
Figure 10:
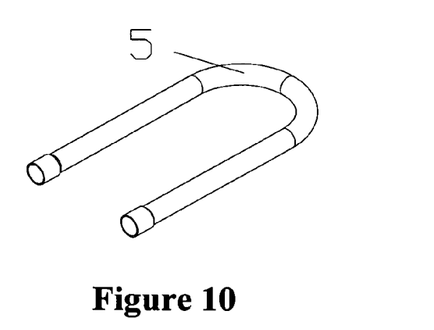
FIG. 10 is a perspective view of U-bend tube of FIG. 7.
Figure 11:
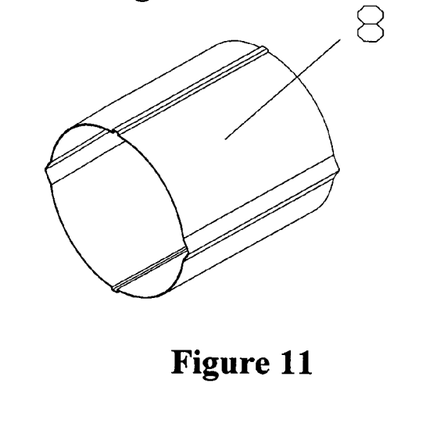
FIG. 11 is a perspective view a shrinkable tube of FIG. 6.
Figure 12:
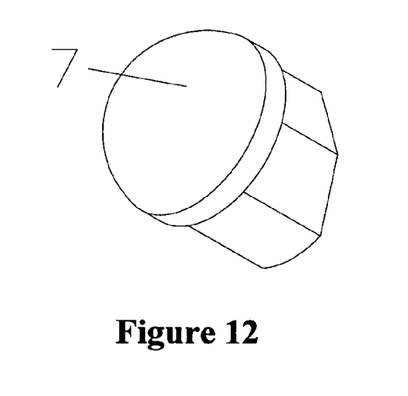
FIG. 12 is a perspective view of end cup shown on FIG. 4.
Figure 13:
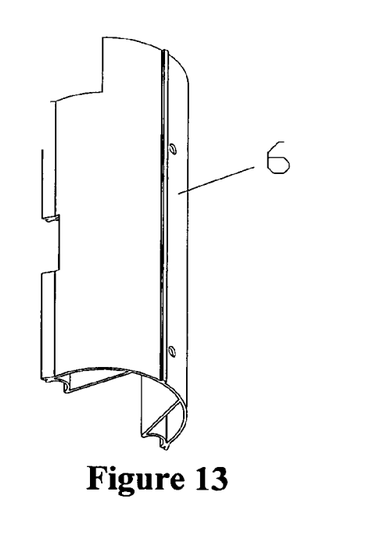
FIG. 13 is a perspective view of end extrusion shown on FIG. 4.
Figure 14:
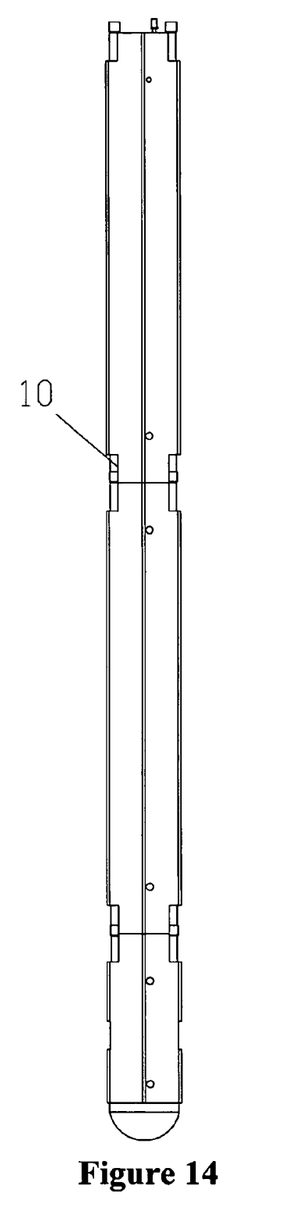
FIG. 14 is a front view of FIG. 1 showing cut outs.
Figure 15:
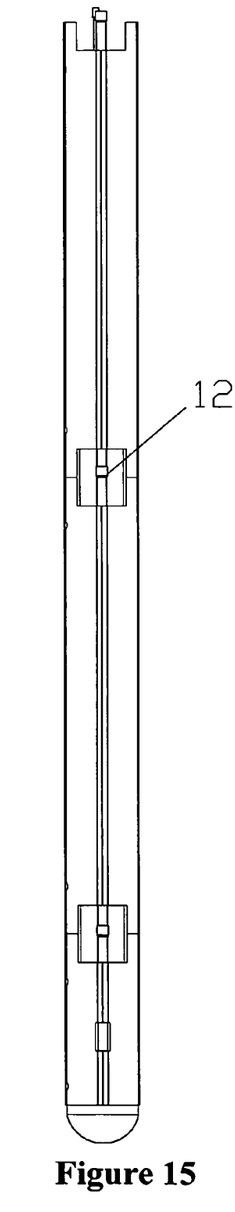
FIG. 15 is a side view of FIG. 14.
Figure 16:
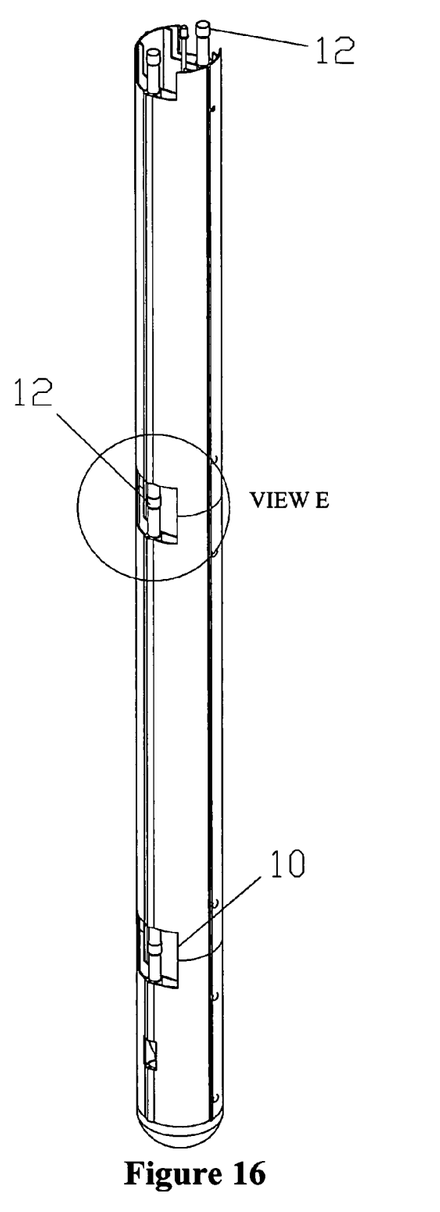
FIG. 16 is a perspective view of FIG. 14.

Referring now to FIGS. 6-8, it is shown a detailed view of a joint between two assemblies. Insulation foam 23, at end section, will limit the accumulation of water and give maximum protection against ice damage. The insulated foam 23 is injected into the open hollow sections. The insulated foam 23 will seal the inside hollow spaces from water. The insulated foam 23 injection could be full or partial; if injection is partial, it is done only at each end of extrusions 1 assembly. In case of partial sealing, the foam 23 will guarantee that the free space occupied by air will be trapped inside extrusions 1 assembly. The adiabatic system exchanger, made by the insulated foam 23 or insulation foam 23 and air, which will guarantee that heat propagation will follow the aluminum optimal paths 21 and 22 to reach ground surface. The thermal paths to reach ground surface are made by two thin aluminum walls 21 and 22 from extrusion 1.

Referring to FIG. 6, showing the top view, the welding edges 11 are very important because they will guarantee the integrity of the coated paint 24 exposed to copper pipes 2 and the electrical oxidation inhibition compound 3. The welding edges 11's length is in function of the temperature propagation gradient, and in function of temperature resistance propriety of the coated paint 25 and the electrical oxidation inhibition compound 3. Welding edges 11 serve as a heat dissipation means during the inherent heat propagation of welding. The tack welding 20 is made by an aluminum welding MIG process that will generate the heat point source. This heat will be quickly dissipated by a cooling water jet sprayed a just few second after the tack welding 20. The extrusion, without a welding edge 11, will be not able to tolerate the welding process, and extrusions 1 will have to be held together with other process such as by strapping or bolting. If welding damages the coated paint 25 or the electrical oxidation inhibition compound 3, a galvanic reaction will occur in the mid- or long-term, and will shorten the lifespan of the exchanger.

For installation of the preferred embodiment, extrusions 1 assembly are delivered to the installation site. Preferably, such a site conforms to geothermal principles (sufficient distance from a foundation of a structure, good contact with ground, etc).

A rock drill is used to make the ground well. The exchanger is inserted into the drill casting after being jointed together. Geothermal filling material is used to fill the casting before removal of drill. This material will guarantee full contact with the geothermal sink exchanger and ground. The well is of a multiple of 20-feet deep. Prior to installation of the heat exchanger, end extrusion 6 that embodies u-bend tube 5 and the end cap 7 is attached to an end of an extrusion 1 in the following manner: an aluminum shear joint connection 4 is inserted inside the end extrusion 6 and riveted in place. At each junction, the extrusions 1 assembly should be tightened against the shear joint connection with rivets to complete the junction. The shear joint connection 4 is also there to take the charge load and keep safe the piping system against load. Shrinkable tubes 8 are used to seal junction and cut out 10 from the extrusions 1.

The copper tubes 2 are swedged at one end to make a welding union connection 12. The copper tubes connection are welded with brazing rod sealfoss (15% silver) to made welding joints 9.

Once the exchanger is assembled, foam 23 is poured into the free spaces of exchanger at each end sections in order to create a thermal shock absorber for temperature changes. Thermal sensors 14 can be installed at each shear joint tube 4 to monitor the wall exchanger temperature. Each thermal sensor 14 is linked together by an electrical cord wires 17 and electrical watertight plugs 18 and 19. It would be advantageous from a technical perspective to integrate such temperature sensors into the present geothermal exchanger.

Geothermal exchanger of the present invention is adapted to harvest heat from the ground that surrounds the geothermal well by means of a conduction and convention in an adiabatic manner.

The geothermal exchanger uses water/glycol fluid, but also could work with a refrigerant. The extrusion design of the present invention provides the ability to change from concentric exchange to uniform exchange. The uniform exchange is two times higher than concentric exchange.

The aluminum extrusions 1 act as heat conductors to melt the ice around the exchanger at the ground level. This chimney effect created in the aluminum extrusions by the phase-changing energy when it is exposed to low temperatures below −10° C. The aluminum exchanger 6 brings heat from lower ground up to the surface to melt the ice around the hole created by the exchanger. The aluminum extrusions 1 are in addition protected against ground corrosion by an imposed current cathodic protection system.

Figure 17:
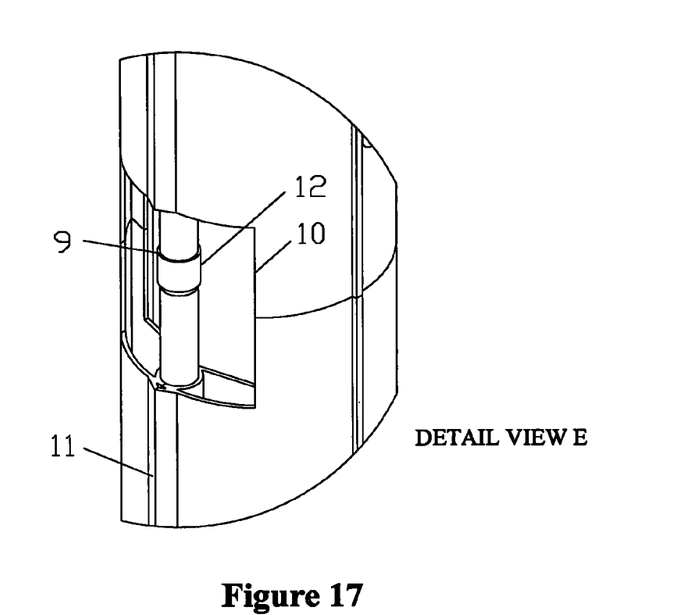
FIG. 17 is a fragmental perspective view E of FIG. 16.
Figure 18:
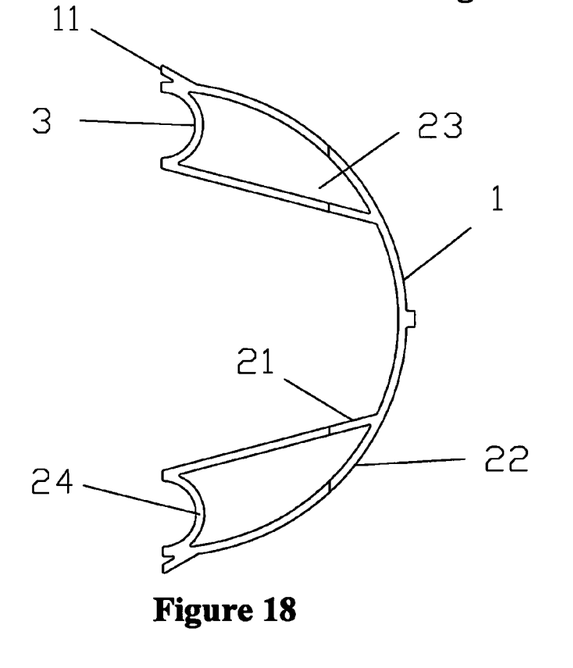
FIG. 18 is a top view of FIG. 13.
Figure 19:
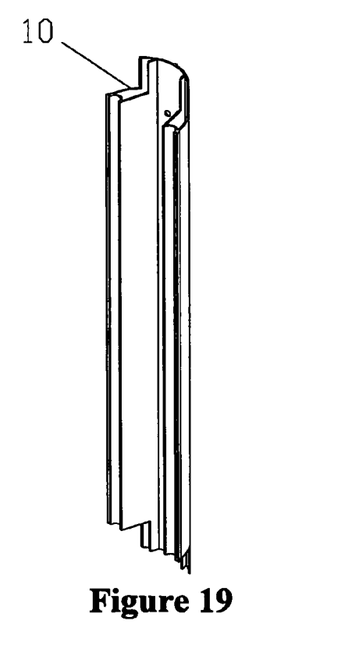
FIG. 19 is a perspective view of FIG. 13 taken from inside perspective.
Figure 20:
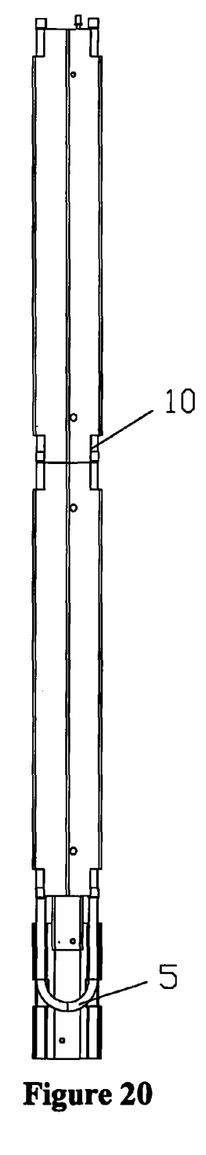
FIG. 20 is a front view of FIG. 14 showing partial cross-sectional view of end portion.
Figure 21:
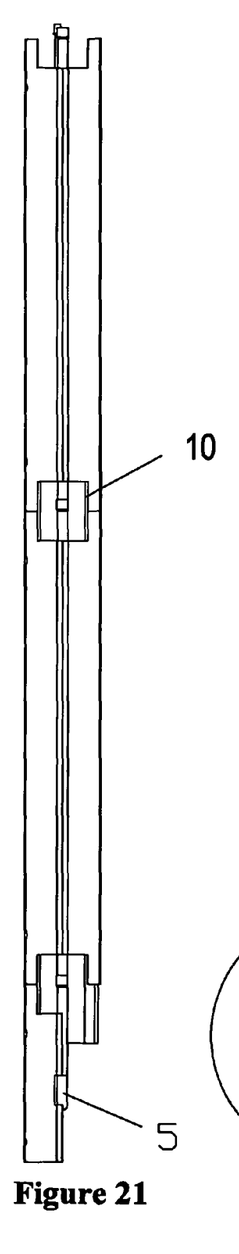
FIG. 21 is a side view of FIG. 20.
Figure 22:
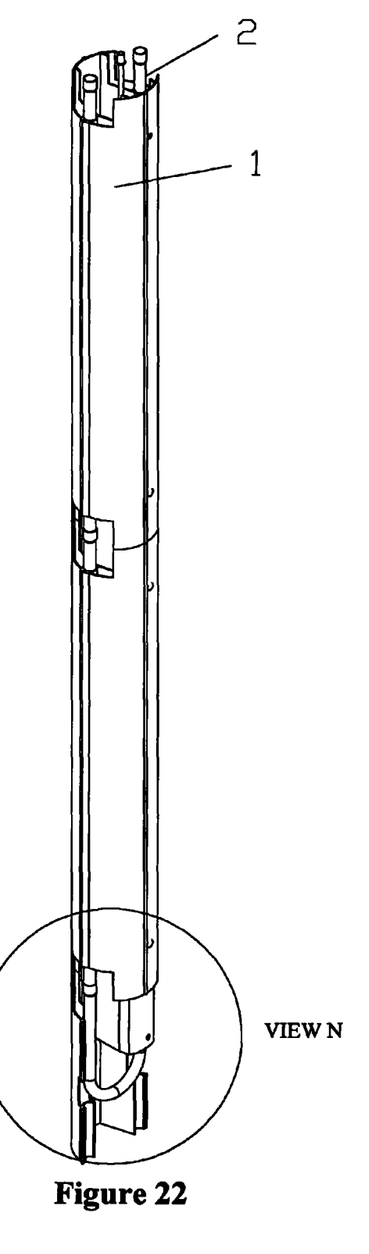
FIG. 22 is a perspective view of FIG. 20.
Figure 23:
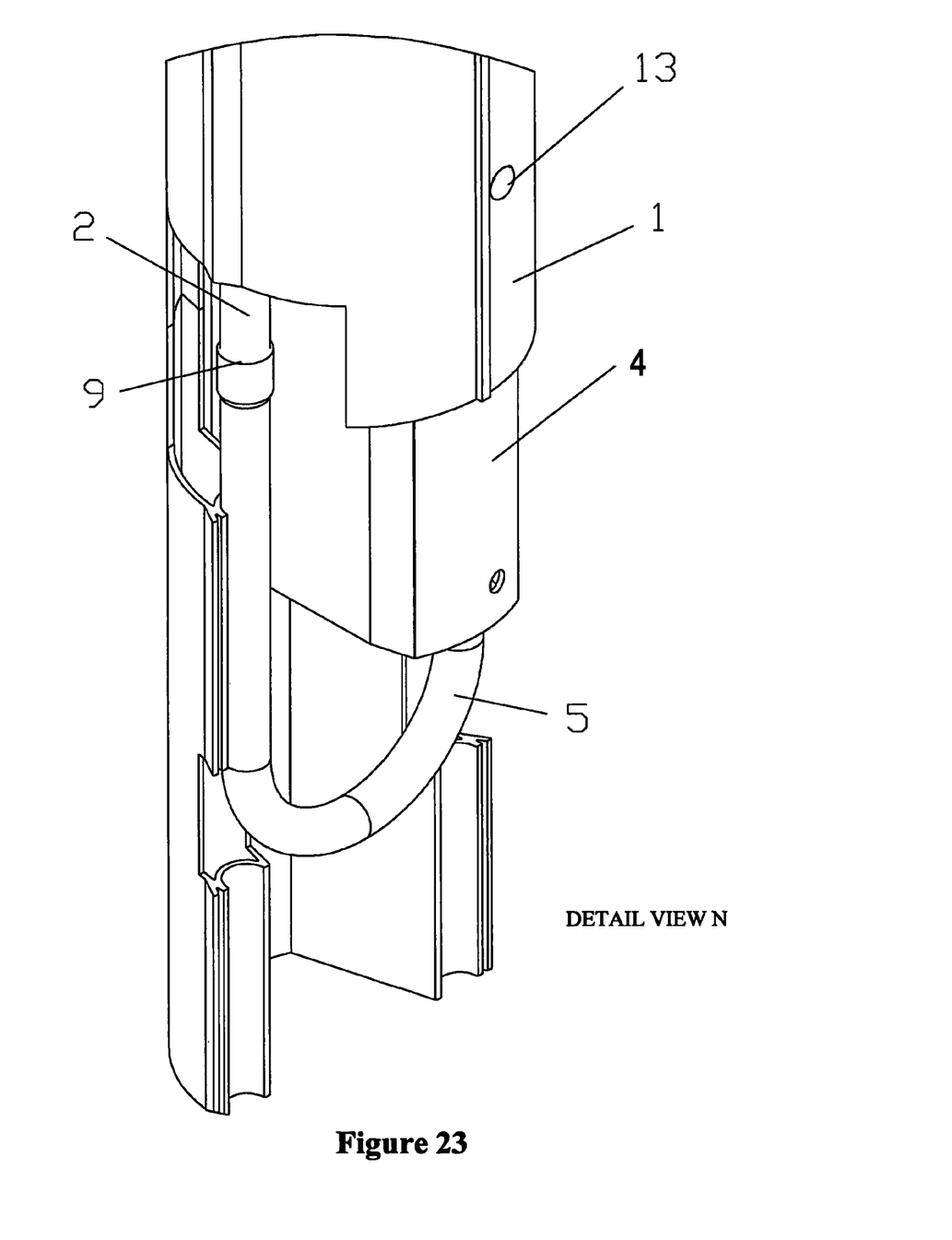
FIG. 23 is a fragmental perspective view N of FIG. 22.
Figure 24:
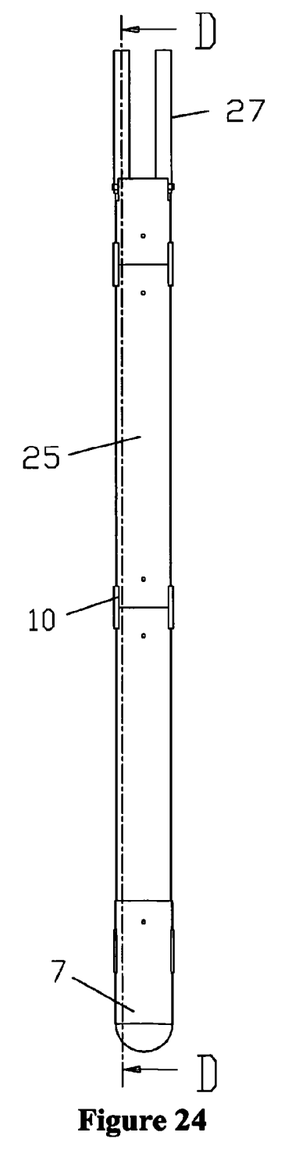
FIG. 24 is a perspective view of the second embodiment of the present invention.
Figure 25:
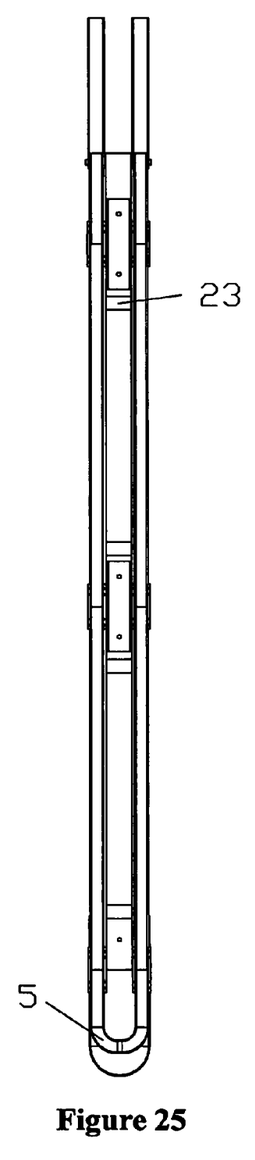
FIG. 25 is a cross-sectional view along lines C-C of FIG. 26.
Figure 26:
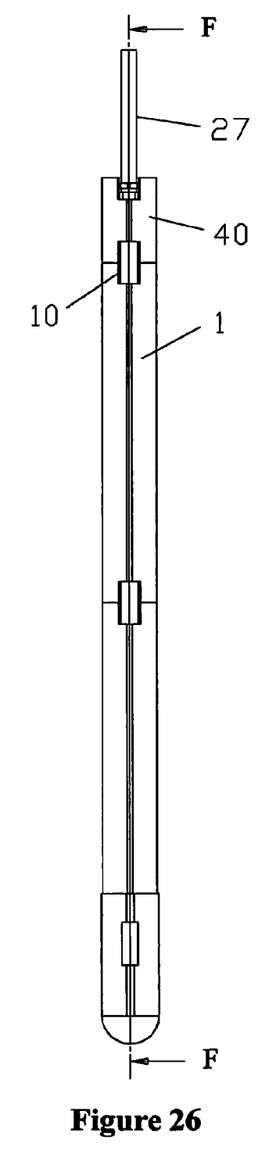
FIG. 26 is a front view of FIG. 24.
Figures 27, 28:
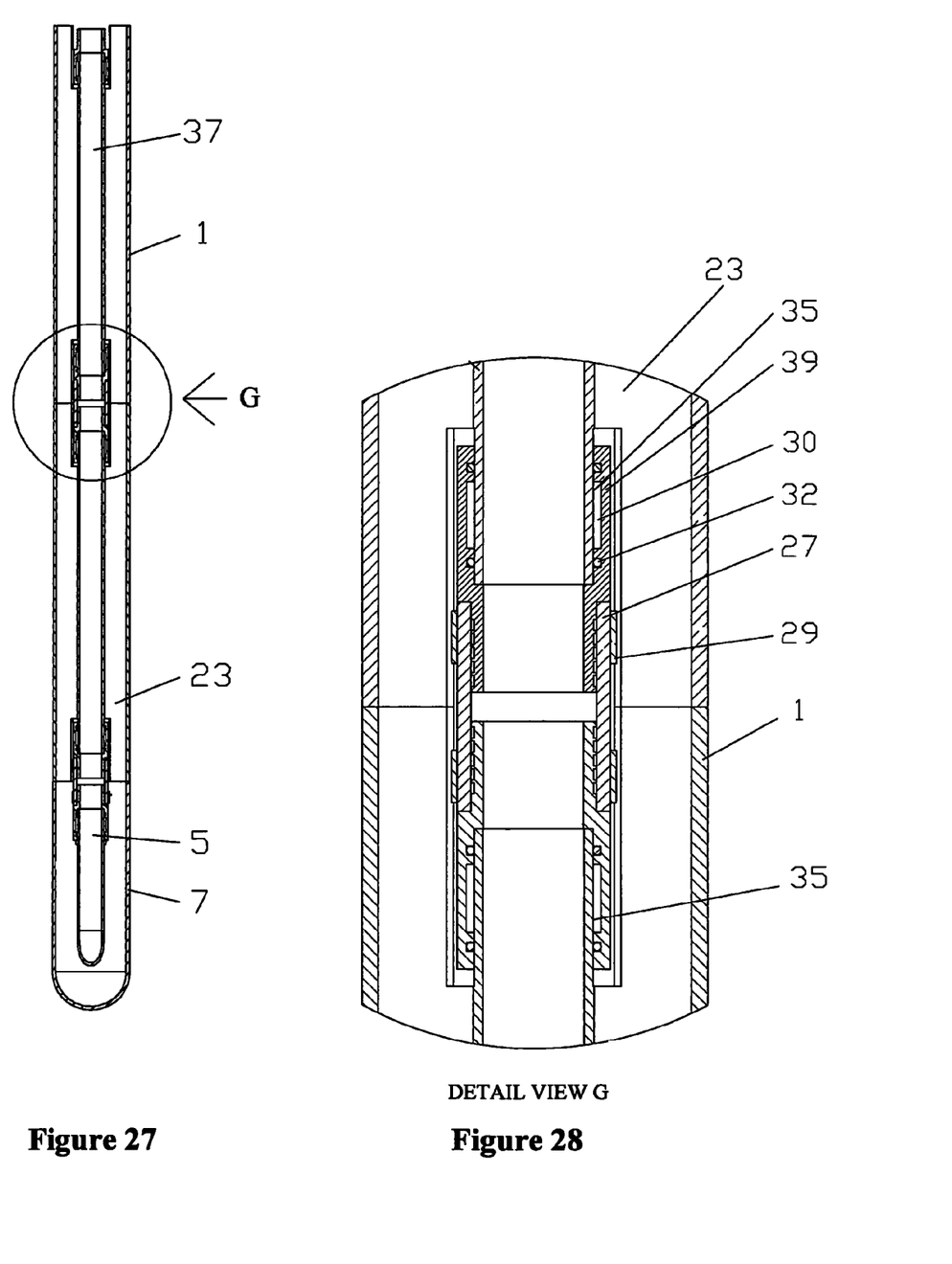
FIG. 27 is a cross-sectional view along lines B-B of FIG. 26.
FIG. 28 is a fragmental view C of FIG. 27.
Figure 29:
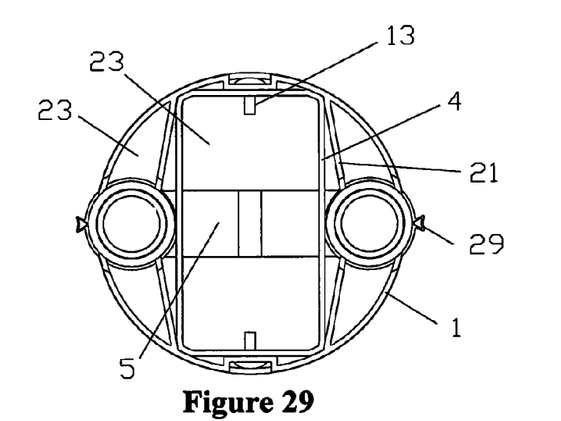
FIG. 29 is a top view of FIG. 24.
Figure 30:
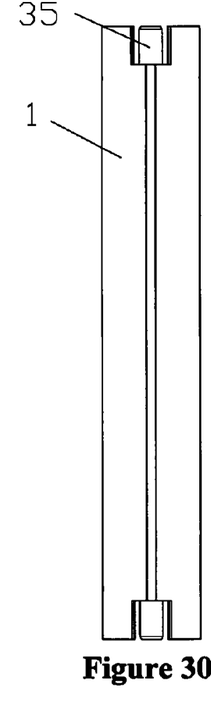
FIG. 30 is a front view of extrusion segment of FIG. 24.
Figure 31:
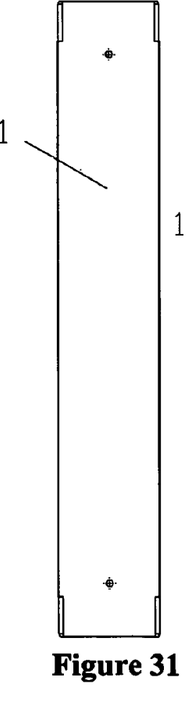
FIG. 31 is a side view of FIG. 30.
Figure 32:
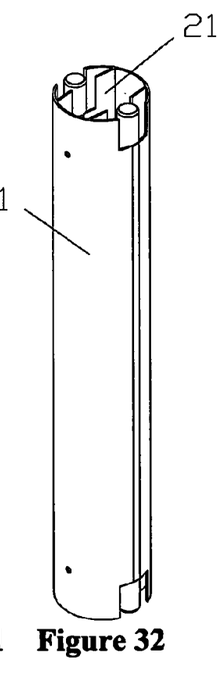
FIG. 32 is a perspective view of FIG. 30.
Figure 33:
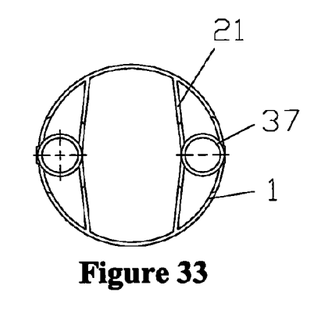
FIG. 33 is a top view of FIG. 30.
Figure 34:
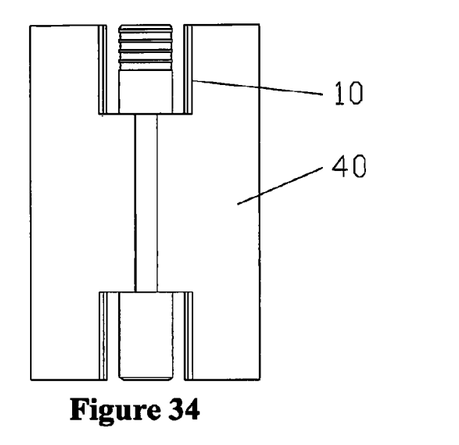
FIG. 34 is a front view of the transitional extrusion shown on FIG. 26.

Referring now to FIGS. 7, 8 and 17, shown is a detailed view of a joint between two assemblies. The copper tube connections are welded with the brazing rod sealfoss (15% silver) to make welding joints 9. Shrinkable tubes 8 are used to seal junctions and at cut-outs 10 of extrusions 1. Compound sealing such as silicone could be used to help to seal extrusions 1 assembly junction with the shrinkable tube 8.

Referring now to FIGS. 24-33, a second embodiment of the present invention is shown. Referring to FIGS. 30-33, a geothermal exchanger of the second embodiment consists of a unitary structure incorporating second exchanger element or housing 1 incorporating within its inner walls a first exchanger elements 37 made as a conduit and provided for circulation of refrigerant. Each conduit 37 has an end pipes 35 provided to connect those conduits 37 via transitional extrusions 40 (FIG. 26) to the source of refrigerant (not shown). PEX end connectors 27 are provided to connect conduits 37 of next section of heat exchanger (see FIGS. 27 & 28). Thin walls 21 formed within housing 1 have similar configuration as thin walls of the first embodiment of the present invention and are provided to reinforce conduits 37 inside housing 1. Referring now to the cross-sectional view of FIGS. 27 and 29, end cap 7 embodying u-turn tube 5 is connected by both sides to conduits 37 and insulation foam 23 is deposited inside housing 1.

Insulation 23 limits the accumulation of water and gives maximum protection against ice damage. On the detailed view of a joint shown on FIG. 28, we see end pipes 35 of conduits 37, upon which is fitted an aluminum fitting 39, gasket 32, structural adhesive 30, and a PEX pipe connectors 27 spanning the gap between end pipes 35 of two extrusions 1. PEX pipe connectors 27 is held in place with clinch clamps 29. Conduits 37 are incorporated inside housing or extrusion 1, and are used for circulation of a refrigerant. Referring now to cross-sectional view shown on FIG. 29 and FIG. 26, it is shown the outer periphery of extrusion 1, clinch clamp 29, aluminum shear joint tube 4 that spans two extrusions 1, held in place with rivets 13, u-turn tube 5, thermal paths made by a thin aluminum wall 21, and insulation 23.

It should be noted that aluminum union connection assembly could be replaced by others types of union connection such as hydraulic system and other types.

Multiple extrusions 1 can be linked together to form a longer heat exchanger. The insulated foam 23 is injected into the open hollow sections. The insulated foam 23 will seal the inside hollow space from water. The insulated foam 23 injection could be fully or partial as at each ends of extrusions assembly. In case of partial sealing, the foam 23 will guarantee that the free space occupied by air will be trapped into the extrusions assembly. The adiabatic system exchanger, made by the insulated foam 23 or insulation foam 23 and air, will guarantee that heat propagation will follow the aluminum optimal paths and to reach ground surface.

PEX pipes are tightened to transition extrusion 1 into the mills PEX pipe connector 27 with the stainless steel clinch clamps 29 clinched with piping hand tool compressing. The extrusion side opening access is made by the manufacturing mills process, to give access to clinch the stainless steel clinch clamp 29 during the installation.

At each junction, the extrusion 1 should be tightened against the shear joint connection 4 with rivets 13. The shear joint connection 4 is located at extrusion 1 junction to take the shear and moment loads and keeping safe the aluminum union connections assembly against stress and deformation.

Second embodiment of the present invention lowers the cost of manufacturing due to the fact that both the outside housing or extrusion 1 (see FIGS. 30-33) and conduit 32 for circulating a refrigerant are both made of aluminum or a similar material, thus eliminating the need to use expensive copper. In the preferred embodiment, housing or extrusion 1 is made by means of extrusion, wherein housing 1 and conduit 37 form a unitary structure, which is a substantial advantage of the present invention.

For installation of the preferred embodiment, extrusions 1 are delivered to the installation site. Preferably, such a site conforms to geothermal principles (sufficient distance from a foundation of a structure, good contact with ground, etc). Optionally, aluminum fittings 39 are pre-installed on each end pipe 35 of conduits 37 by fitting two gaskets 32 inside the pre-milled grooves inside the wider part, sliding fitting 39 onto the end pipe 35 of conduits 37. Adhesive 30 is injected into the space made by a milled groove in the wider part of fitting 39 through a hole (not shown), thus creating a permanent and absolute seal, adhering fitting 39 to end pipe 35.

A rock drill is used to make the ground well. The exchanger is inserted into the drill casting after being jointed together. Sand is used to fill the casting before removal of drill. This sand will guarantee full contact with the geothermal sink exchanger and ground. The well is of a multiple of 20-feet deep.

Prior to installation of the heat exchanger, end cap 7 that embodies u-turn tube 5 connected between two conduits 37 is attached to an end of an extrusion 1 in the following manner: an aluminum shear joint tube 4 is inserted inside end pipe 35 of conduit 37 and riveted in place so that half of it sticks out of end tube 35. PEX tubes 27 are clamped using clinch clamps 29 to the fittings 39 that are on end pipes 35 of end cap 7. An extrusion 1 is lowered onto the protruding half of said aluminum shear joint tube 4 so that said PEX tubes 27 engage with the fittings 39 located on end pipes 35 of said extrusion 1. Said extrusion 1 is aligned so that it can be riveted to said aluminum shear joint tube 4, and said PEX tubes 27 are clamped with clinch clamps 29 to said fittings 39 on end pipes 35 of said extrusion 1. Thus, additional extrusions 1 are affixed to the free fittings 39 on end pipes 35 of conduits 37 until an exchanger of required length is created.

Once the exchanger is assembled, foam 23 is poured into the free spaces of exchanger in order to create a thermal shock absorber for temperature changes. Thermal sensors (not shown) can be installed at each shear joint tube 4 to monitor the wall exchanger temperature. It would be advantageous from a technical perspective to integrate such temperature sensors into the present geothermal exchanger.

The geothermal exchanger uses water/glycol fluid, but could work with a refrigerant. The extrusion design gives the ability to change from concentric exchange to uniform exchange. The uniform exchange is two times higher that concentric exchange.

The aluminum extrusions 1 act as heat conductors to melt the ice around the exchanger at the ground level. This chimney effect created in the aluminum extrusions by the phase-changing energy when it is exposed to low temperatures below −10° C. The aluminum exchanger 6 brings heat from lower ground up to the surface to melt the ice around the hole created by the exchanger. The aluminum extrusions 1 are in addition protected against ground corrosion by an imposed current cathodic protection system.

The extrusion manufacturing process is made with a direct or indirect extrusion press that uses aluminum or magnesium billets. The press pushes a heated, soft metal billet into a matrix that deforms the billet. The billet is pushed into the matrix form, and results in a deformation of the aluminum or magnesium billet into the matrix's shape. The hollow sections are welded with aluminum welding and argon bed process to attain the maximum strain of aluminum's welding propriety.

The choice of material for the extrusion takes into account four characteristics:

The first characteristic is the extrudability of the ductile metal. The metal should be extrudable, and have a good end result without warping or changing its dimensions after extrusion.

The second characteristic is the material's mechanical properties: its capacity to withstand high stress, and good fatigue resistance.

The third characteristic is the material's thermal propriety: the ratio of the thermal diffusivity divided by the density. This ratio will give the reaction time of the material in function with its weight. The price of material is based on weight, meaning that the material with the higher the ratio, the more profitable a material is to use. According to our research, aluminum is the best material, especially the series 5xxx and 6xxx, because it has a higher ratio compared to other non-ferrous metals. Magnesium comes in second, followed by copper and brass. Steel is at the end of the list of efficient metals, because it is very susceptible to corrosion when exposed to water.

The fourth characteristic is corrosion resistance properties against aqua medium with pH variations and resisting salt attacks.

The material should have as many favorable qualities of the four characteristics as possible.

It must be emphasized that the first and second embodiments of the present invention of the adiabatic-isothermal sink exchangers always have conduction heat transfer between ground and exchanger that is twice higher than traditional geothermal exchangers, if compared by foot-length, when ground or rock is thermally saturated with exchanger.

The adiabatic-isothermal sink exchanger has been compared to a traditional geothermal exchanger and a DX system in resistive tests in ground and rock conditions. The exchanger of the present invention has largely surpassed the technologies of direct exchange systems and screw-sunk heat exchanger systems.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

The invention claimed is:

1. A geothermal exchanger system comprising:
a first exchanger element comprising a return loop placed within a geothermal well, said first exchanger element is provided for circulating a refrigerant adapted to harvest heat from a ground surrounding said geothermal well by means of conduction and convection;
a second exchanger element also placed within said geothermal well, said second exchanger element is formed from a material having thermal conductivity up to 150 w/m*k, said second exchanger element is also adapted to harvest heat from the ground surrounding said geothermal well by means of conduction and convection;
said first exchanger element is totally encased within said second exchanger element, wherein said second exchanger element is placed in direct contact with the ground surrounding said geothermal well and
wherein outer walls of said first exchanger element abut inner walls of said second exchanger element along an entire length of said second exchanger element,
wherein said second exchanger element has configuration of a housing, wherein said housing is made of non-ferrous metal having thermal diffusivity up to 80 $mm^2$/sec,
wherein said housing consists of a number of segments securely connected to each other by means of joint tubes and
wherein each of those segments consists of two identical hollow halves securely connected to each other.

2. A geothermal exchanger system according to claim 1, wherein said first exchanger element is a copper pipe.

3. A geothermal exchanger system according to claim 2, wherein said copper pipe is incorporated within a channel formed along an inner edge of said housing.

4. A geothermal exchanger system according to claim 1, wherein an outer wall of said housing is covered by a powder paint to provided optimal protection against galvanic reaction from the ground surrounding said geothermal well.

5. A geothermal exchanger system according to claim 2, wherein the outer wall of said copper pipe is covered with an electrical oxidation inhibitor compound to provide optimal protection against galvanic reaction between said housing and said copper pipe.

6. A geothermal exchanger system according to claim 3, wherein a width of said channel has at least 80% press fit contact with said copper pipe.

7. A geothermal exchanger system according to claim 5, wherein said electrical oxidation inhibitor compound fills 20% tolerance gap between said copper pipe and an inner wall of said channel allowing maximum transfer of heat from the inner wall of said housing to the outer wall of said copper pipe.

8. A geothermal exchanger system according to claim 1, wherein said housing is made of aluminum.

9. A geothermal exchanger system according to claim 1, wherein said first exchanger element and said second exchanger element form a unitary one-piece configuration.

10. A geothermal exchanger system according to claim 9, wherein said first exchanger element and said second exchanger element are made of non-ferrous metal having a thermal diffusivity up to 80 $mm^2$/s.

11. A geothermal exchanger system according to claim 10, wherein said first and said second exchanger elements are made of aluminum by way of extrusion.

12. A geothermal exchanger system comprising:
a first exchanger element comprising a return loop placed within a geothermal well, said first exchanger element is provided for circulating a refrigerant adapted to harvest heat from a ground surrounding said geothermal well by means of conduction and convection;
a second exchanger element also placed within said geothermal well, said second exchanger element is formed from a material having thermal conductivity up to 150 w/m*k, said second exchanger element is also adapted to harvest heat from the ground surrounding said geothermal well by means of conduction and convection;
said first exchanger element is totally encased within said second exchanger element, wherein said second exchanger element is placed in direct contact with the ground surrounding said geothermal well,
wherein outer walls of said first exchanger element abut inner walls of said second exchanger element along an entire length of said second exchanger element, and
wherein said second exchanger element has configuration of a housing, wherein said housing is made of non-ferrous metal having a thermal diffusivity up to 80 $mm^2$/s,
wherein said second exchanger element has configuration of a housing, wherein said housing is made of non-ferrous metal having thermal diffusivity up to 80 $mm^2$/sec,
wherein said housing consists of a number of segments securely connected to each other by means of joint tubes,
wherein each of those segments consists of two identical hollow halves securely connected to each other and
wherein said first exchanger element is a copper pipe.

13. A geothermal exchanger system according to claim 12, wherein said housing consists of a number of segments securely connected to each other by means of joint tubes.

14. A geothermal exchanger system according to claim 12, wherein said copper pipe is incorporated within a channel formed along an inner edge of said housing, and wherein a width of said channel has at least 80% press fit contact with said copper pipe.

15. A geothermal exchanger system according to claim 12, wherein an outer wall of said housing is covered by a powder paint to provided optimal protection against galvanic reaction from the ground surrounding said geothermal well.

16. A geothermal exchanger system according to claim 12, wherein the outer wall of said copper pipe is covered with an electrical oxidation inhibitor compound to provide optimal protection against galvanic reaction between said housing and said copper pipe, and wherein said electrical oxidation inhibitor compound fills 20% tolerance gap between said copper pipe and an inner wall of said channel allowing maximum transfer of heat from the inner wall of said housing to the outer wall of said cooper pipe.

* * * * *